United States Patent
Rodgers

(10) Patent No.: US 11,507,620 B2
(45) Date of Patent: Nov. 22, 2022

(54) SELF-TRANSFORMING CONTENT OBJECTS

(71) Applicant: ORACLE INTERNATIONAL CORPORATION, Redwood Shores, CA (US)

(72) Inventor: Michael P. Rodgers, Rochester, MN (US)

(73) Assignee: Oracle International Corporation, Redwood Shores, CA (US)

(*) Notice: Subject to any disclaimer, the term of this patent is extended or adjusted under 35 U.S.C. 154(b) by 1345 days.

(21) Appl. No.: 15/417,753

(22) Filed: Jan. 27, 2017

(65) Prior Publication Data

US 2018/0217963 A1 Aug. 2, 2018

(51) Int. Cl.
| | |
|---|---|
| *G06F 16/84* | (2019.01) |
| *G06F 16/958* | (2019.01) |
| *G06F 16/957* | (2019.01) |
| *G06F 40/117* | (2020.01) |
| *G06F 40/149* | (2020.01) |
| *G06F 40/143* | (2020.01) |

(52) U.S. Cl.
CPC ............. *G06F 16/84* (2019.01); *G06F 16/88* (2019.01); *G06F 16/9577* (2019.01); *G06F 16/972* (2019.01); *G06F 16/986* (2019.01); *G06F 40/117* (2020.01); *G06F 40/143* (2020.01); *G06F 40/149* (2020.01)

(58) Field of Classification Search
CPC ........................................................ G06F 17/21
USPC ........................................................ 715/235
See application file for complete search history.

(56) References Cited

U.S. PATENT DOCUMENTS

| | | | | |
|---|---|---|---|---|
| 9,658,998 B2 * | 5/2017 | Dillard | ................. | G06F 17/289 |
| 2011/0099467 A1 * | 4/2011 | Kapur | .................... | H04L 67/02 |
| | | | | 715/236 |

FOREIGN PATENT DOCUMENTS

WO WO-0150349 A1 * 7/2001 ........... G06F 17/218

* cited by examiner

*Primary Examiner* — Andrew R Dyer
*Assistant Examiner* — Tionna M Burke
(74) *Attorney, Agent, or Firm* — Kraguljac Law Group, LLC

(57) ABSTRACT

Systems, methods, and other embodiments associated with self-transformation objects are described. In one embodiment, a method includes determining that a content object is to be rendered. The example method may also include evaluating attributes of a user to identify a content preference of the user. The example method may also include identifying a content transformation mapping that corresponds to the content preference. The example method may also include parsing the content object to identify a transformation script. The example method may also include executing the transformation script to parse the content object to identify elements that are tagged with a transformation tag. The example method may also include executing the transformation script to apply corresponding transformations from the content transformation mapping to the tagged elements. The example method may also include rendering the content object with the transformed elements.

20 Claims, 7 Drawing Sheets

SELF-TRANSFORMING CONTENT OBJECTS

BACKGROUND

Many content objects, such as websites, are developed for users with different language preferences. For example, a retail company develops a retail website that will be accessible to customers in multiple countries with different native languages. The retail company must create separate website content objects for each language that will be supported by the retail website. For example, a first website content object is created to comprise text of the retail website in a first language, images of the website, script executed by the website, etc. In order to support a second language, the retail company must create an entirely separate website content object comprising text of the retail website in the second language, the images of the website, the script executed by the website, etc. The website content objects are uploaded to a content hosting system that will host different instances of the retail website in the various languages.

As more languages are supported by the retail company, more storage space is used to store all the different website content object instances. Such storage space utilization is wasteful because the storage space is used to store redundant data that is similar between the website content objects. For example, the images, the script, and/or other data is similar amongst the website content objects, and thus is stored as multiple instances of duplicate data. Similarly, when the retail company uploads each individual website content object to the content hosting system, network bandwidth is wasted because the duplicate data, such as the images and script, are transferred multiple times in the different website content objects to the content hosting system. If the retail company wants to change an aspect of the retail website such as to add a button, then the retail company must waste substantial amounts of time and resources to individually change the aspect within each website content object instance. Also, substantial amounts of resources, time, and costs are incurred as overhead for repeat testing.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Computerized systems and methods are described herein that provide for self-transforming content objects. A content object can be defined for a website, a lightweight application, or other content that is provided to users. In an embodiment, the content object is defined for a website, and comprises HyperText Markup Language (HTML) of the website, any scripts that are to be executed by the website, any images and text that are displayed by the website, and/or any other user interface elements of the website. As provided herein, a transformation script is embedded into the content object. The transformation script is configured to dynamically transform elements of the content object such as during a page load event and/or during a rendering phase of the website. In this way, the content object is self-transforming because the transformation script, embedded within the content object, is used to identify and transform elements that are tagged with transformation tags. The transformation tags comprise declarative syntax indicating that such elements are to be transformed.

The transformation script transforms tagged elements based upon transformations within a content transformation mapping that is specified for a content preference of a user. In one embodiment, a set of content transformation mappings are specified for various languages, where a content transformation mapping maps element identifiers of elements to translated strings of a particular language. Upon determining that the user has a preference for a German language, a German language content transformation mapping is identified. The German language content transformation mapping is evaluated to identify German language strings used to transform text of the website. The transformation script parses the content object to identify the tagged elements. The transformation script replaces text of the tagged elements with corresponding German language strings within the German language content transformation mapping. The transformation script can perform various transformations, such as language translation, modify display attributes of elements such as colors or font sizes, modify visibility attributes of elements, change an element from displaying one image to a different image, etc. In this way, a single content object can self-transform elements of the content object using the transformation script embedded therein.

Figure 1:
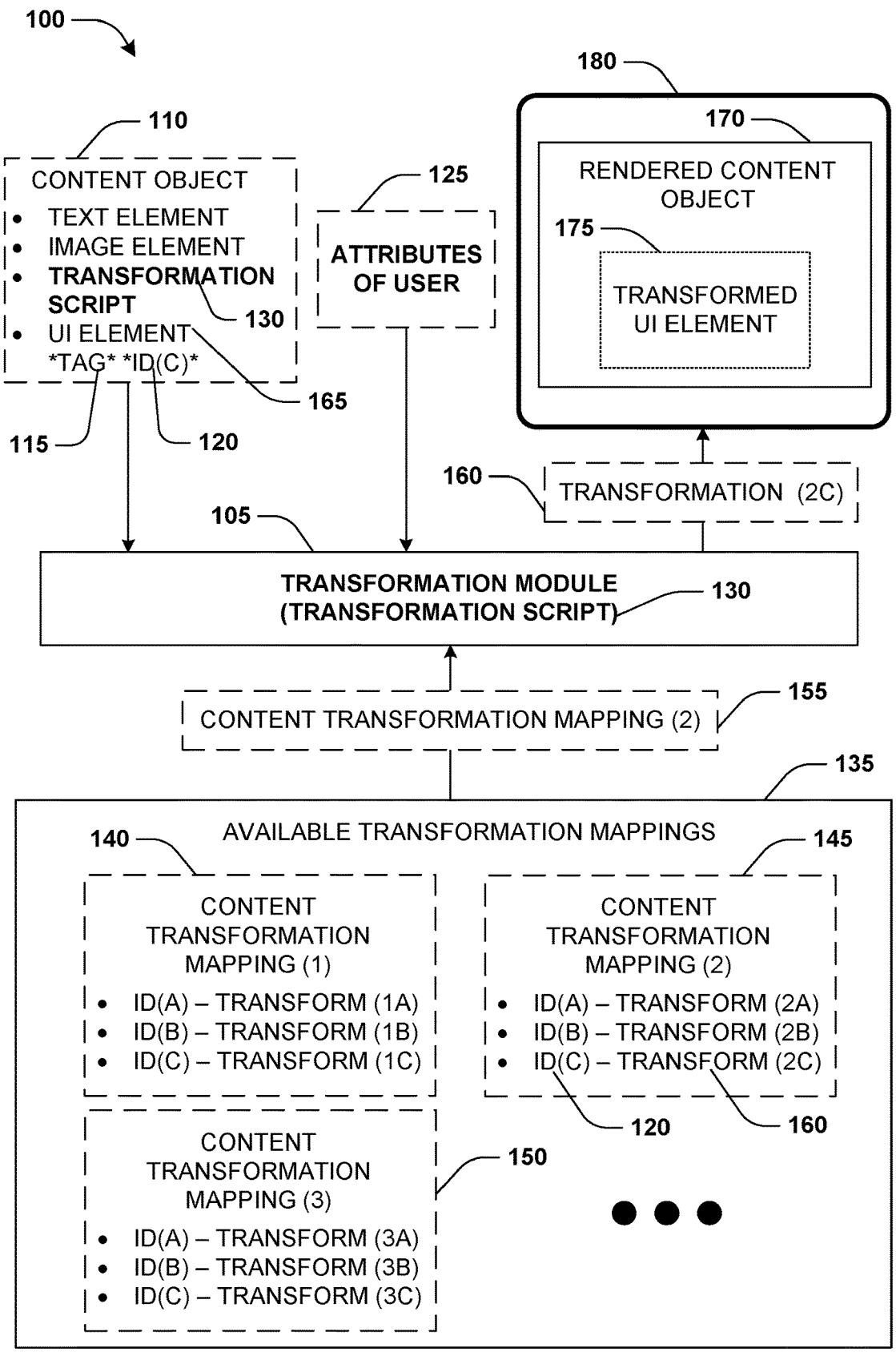
FIG. 1 illustrates an embodiment of a system associated with self-transforming content objects.

With reference to FIG. 1, one embodiment of a computer system 100 associated with self-transformation content objects is illustrated. The system 100 includes a transformation module 105, which can be configured to execute on a computer, such as computer 715 of FIG. 7. The transformation module 105 determines that a content object 110 is to be rendered through a display 180. In an embodiment, the content object 110 corresponds to a website, and comprises HTML of the website, user interface elements of the website, scripts run by the website, text, images, and/or other elements of the website. The content object 110 is a self-transforming content object that can transform elements of the content object 110 by executing a transformation script 130 embedded into the content object 110. Self-transformation may be performed at various stages, such as during a page load event, a rendering phase, etc.

The transformation module 105 evaluates attributes 125 of a user to whom the content object 110 is to be displayed through the display 180. In this way, the transformation module 105 identifies a content preference of the user. In an embodiment, the transformation module 105 evaluates attributes 125 such as a location of the user (e.g., global positions system (GPS) coordinates of a computing device associated with the display 180), a language preference specified by the user, a user profile, social network data, demographic data of the user, and/or other data or settings of the user. In one embodiment, the user may have a content preference to read text with a 14pt Arial font. In one embodiment, the user may post a social network post that the user has a hard time seeing text in any other font or size than 14pt Arial font. In another embodiment, the user may specify through a user profile or computer setting that the user prefers text to be display at the 14pt Arial font. In this way, the social network post, the user profile, the computer setting, and/or other attributes are used to identify a content preference of the user.

The transformation module 105 identifies a content transformation mapping that corresponds to the content preference. In one embodiment, the content transformation mapping may be stored local to the transformation module 105 (e.g., stored on a device that is associated with the display 180). In another embodiment, the transformation module 105 may be stored remotely by a server such that the transformation module 105 performs an asynchronous call (e.g., an asynchronous JavaScript and extensible markup language (AJAX) call) to the server to retrieve a property file comprising the content transformation mapping. The content transformation mapping comprises mappings between element identifiers of elements and transformations to apply to the elements.

In an embodiment, the transformation module 105 uses the content preference to query a set of available transformation mappings 135. The set of available transformation mappings 135 comprises a first content transformation mapping 140, a second content transformation mapping 145, a third content transformation mapping 150, and/or other content transformation mappings.

The first content transformation mapping 140 may correspond to a Spanish language content transformation mapping, where an element identifier (A) is mapped to a Spanish text string (1A), an element identifier (B) is mapped to a Spanish text string (1B), an element identifier (C) is mapped to a Spanish text string (1C), etc. In this way, the Spanish language content transformation mapping can be used by the transformation script 130 to replace text of elements having the element identifier (A) with the Spanish text string (1A), text of elements having the element identifier (B) with the Spanish text string (1B), and text of elements having the element identifier (C) with the Spanish text string (1C).

The second content transformation mapping 145 may correspond to a 14 pt Arial font content transformation mapping, where the element identifier (A) is mapped to a 14 pt Arial font text string (2A), the element identifier (B) is mapped to a 14 pt Arial font text string (2B), the element identifier (C) is mapped to a 14 pt Arial font text string (2C), etc. In this way, the 14 pt Arial font content transformation mapping can be used by the transformation script 130 to replace text of elements having the element identifier (A) with the 14 pt Arial font text string (2A), text of elements having the element identifier (B) with the 14 pt Arial font text string (2B), and text of elements having the element identifier (C) with the 14 pt Arial font text string (2C).

The third content transformation mapping 150 may correspond to a German language content transformation mapping, where the element identifier (A) is mapped to a German text string (3A), the element identifier (B) is mapped to a German text string (3B), the element identifier (C) is mapped to a German text string (3C), etc. In this way, the German language content transformation mapping can be used by the transformation script 130 to replace text of elements having the element identifier (A) with the German text string (3A), text of elements having the element identifier (B) with the German text string (3B), and text of elements having the element identifier (C) with the German text string (3C).

It may be appreciated that a wide variety of content transformation mappings may be available, such as for transforming languages, fonts, colors, visibility attributes, images, sounds, currency, units of measure (e.g., miles vs kilometers, Fahrenheit vs Celsius, etc.), and/or other attributes of elements of content objects.

The transformation module 105 identifies 155 the second content transformation mapping 145 as corresponding to the 14 pt Arial font content preference because the second content transformation mapping 145 relates to transforming text to 14 pt Arial font.

The transformation module 105 parses the content object 110 to identify a transformation script 130 embedded within the content object 110. The transformation script 130 is executed on the content object 110 to cause the content object 110 to transform itself. In one embodiment, the transformation script 130 is executed during a page load event, a rendering phase, or at any other time in order to parse the content object 110 and/or transformation elements.

The transformation script 130 parses the content object 110 to identify any elements (e.g., text, a user interface element, an image, a background, any portion of a webpage, etc.) that are tagged with a transformation tag indicating that such elements are to be transformed. The transformation script 130 identifies a user interface element 165 having a transformation tag 115 and an element identifier ID(C) 120. In one embodiment of parsing the content object 110, a document object model of the content object 110 is parsed during a rendering phase to identify markup language within the document object model matching a transformation tag template such as "transformtag".

A declarative syntax may have been used to define the transformation tag. In one embodiment of using the declarative syntax, a title element News Website is defined as <h1 class="transformtab" key="News_Website_Element_ID">News Website</h1>, where the transformation tag is indicated by class="transformtag" and an element identifier of the title element News Website is defined as key="News_Website_Element_ID". Accordingly, the transformation script 130 identifies the title element News Website as being tagged with the transformation tag class="transformtag", and thus the title element News Website is to be transformed.

The transformation script 130 evaluates the second content transformation mapping 145 to determine that a transformation (2C) 160 is to be applied to the user interface element 165 because the element identifier ID(C) 120 of the user interface element 165 is mapped to the transformation (2C) 160 within the second content transformation mapping 145. The transformation script 130 performs a self-transformation of the content object 110 by applying the transformation (2C) 160 to the user interface element 165 to create a transformed user interface element 175.

In one embodiment of self-transformation, the transformation script 130 replaces a first value of an attribute of the user interface element 165 with a second value specified by the transformation (2C) 160. The attribute may correspond to a property of a user interface element, such as a size, a display location, a color, a background color, a font type, a font size, an image to display, a hyperlink, a visibility property, etc.

In one embodiment of self-transformation, the transformation script 130 changes a visibility attribute of the user interface element 165 from a first value to a second value specified by the transformation (2C) 160. The visibility attribute may be changed from visible to hidden so that the user does not see the user interface element 165.

In one embodiment of self-transformation, the transformation script 130 replaces a text string of the user interface element 165, in a first language, to a second text string, in a second language, specified by the transformation (2C) 160. In this way, the transformation script 130, embedded within the content object 110, performs self-translation between various languages.

In one embodiment of self-transformation, the transformation script 130 changes the user interface element 165 from displaying a first image to displaying a second image specified by the transformation (2C) 160. Instead of the user interface element 165 showing an image of Jack, the transformed user interface element 175 will show an image of Sarah based upon the content preference identifying the user as Sarah.

In one embodiment of self-transformation, the transformation script 130 changes a color property setting of the user interface element 165 from a first value to a second value specified by the transformation (2C) 160. The color property setting may be changed from black to green.

In one embodiment where the content object 110 corresponds to multiple webpages, the transformation script 130 parses the multiple webpages and transforms any elements within the multiple webpages that are tagged with transformation tags.

In this way, the content object 110, with the transformed user interface element 175, is rendered 170 through the display 180.

In one embodiment, the content object 110 is to be rendered on a second device associated with a second user different than the user.

Accordingly, second attributes of the second user are evaluated to identify a second content preference of the second user (e.g., the user may prefer green text while the second user prefers red text). A content transformation mapping corresponding to the second content preference is identified (e.g., the content transformation mapping comprises transformations of text into a red font color). Transformations within the content transformation mapping are applied to elements tagged with the transformation tag. In this way, the same content object 110 is displayed differently for different users having different content preferences, such as different language preferences, color preferences, etc.

In one embodiment, an update for the content object 110 is received. A single update operation is performed to update the content object 110 for a plurality of supported transformations since the single content object 110, now updated, can still be transformed into various transformations such as various languages.

Figure 2:
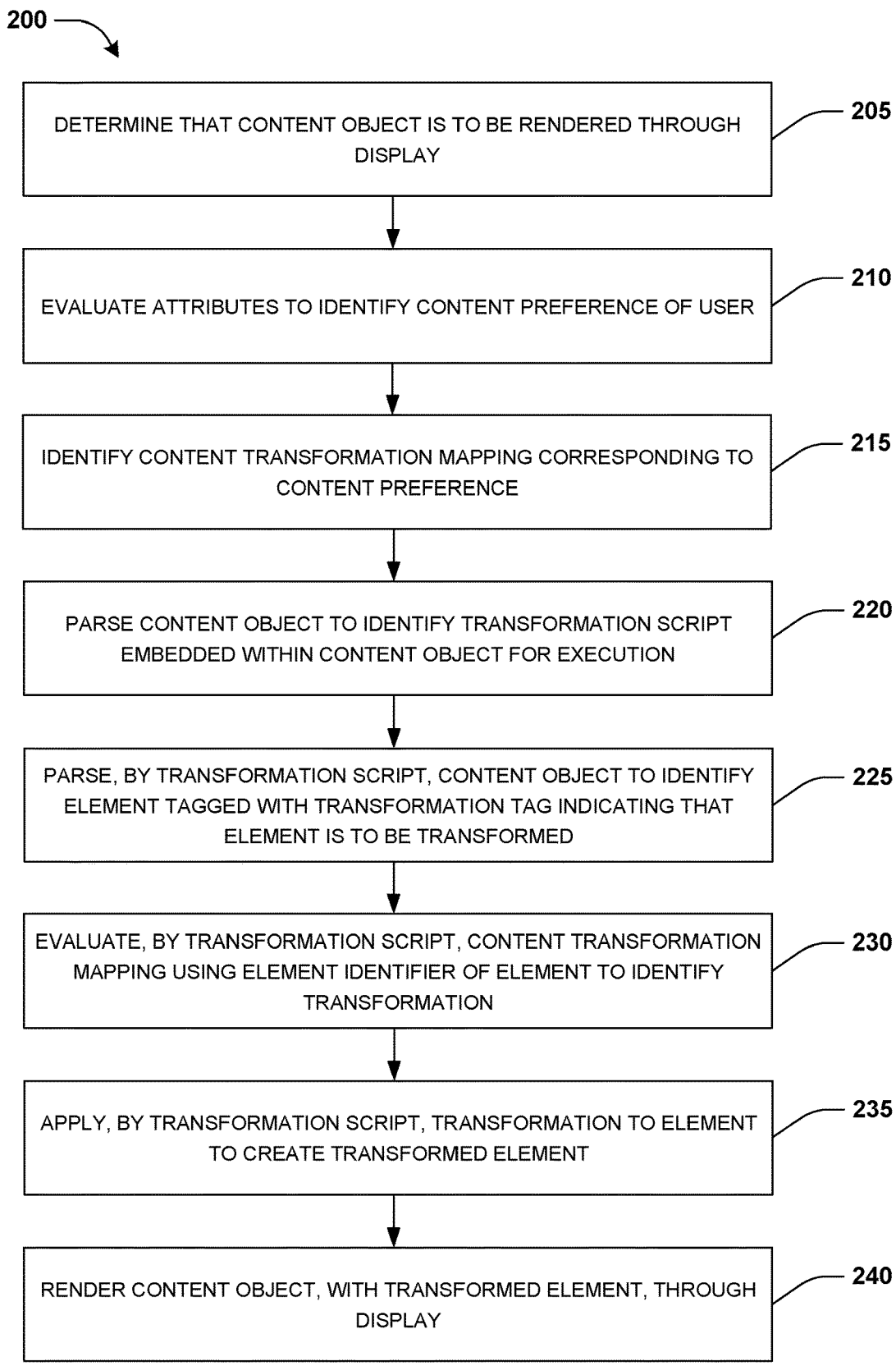
FIG. 2 illustrates an embodiment of a method associated with self-transforming content objects.
Figure 3:
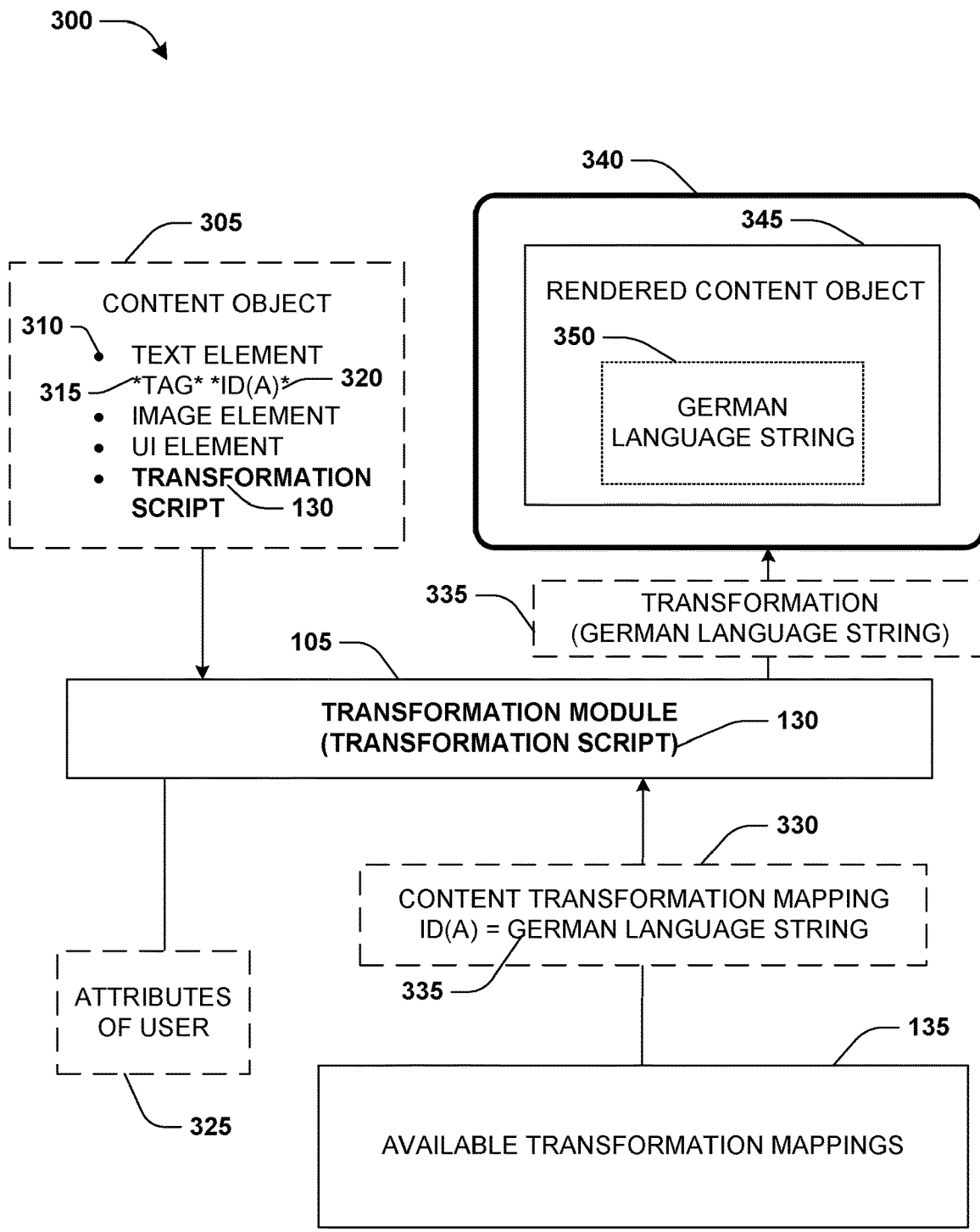
FIG. 3 illustrates an embodiment of a system associated with self-transforming content objects, where a text string is transformed from a first language to a second language.

With reference to FIG. 2, one embodiment of a computer implemented method 200 associated with self-transforming content is illustrated. In one embodiment, the method 200 is performed by the transformation module 105 utilizing various computing resources of the computer 715, such as the processor 720 for executing instructions associated with executing the transformation script 130. Memory 735 and/or disks 755 are used for storing the content object 305. Network hardware is used for communicating data structures between the computer 715 and remote computers over a network. The method 200 is triggered, at 205, upon a determination that the content object 305 is to be rendered through a display 340, as illustrated by system 300 in FIG. 3.

At 210, attributes 325 of a user are evaluated to identify a content preference of the user. In one embodiment, a user profile is evaluate to determine that the user prefers a German language. At 215, a content transformation mapping 330 is identified from available transformation mappings 135 based upon the content transformation mapping 330 corresponding to the German Language content preference of the user. The content transformation mapping 330 comprises mappings between element identifiers of elements and transformations to apply to the elements, such as German text strings to apply to elements tagged with transformation tags.

At 220, the content object 305 is parsed to identify a transformation script 130 embedded within the content object 305. The transformation script 130 is executed on the content object 305 to cause the content object 305 to transform itself. At 225, the transformation script 130 parses the content object 305 to identify elements tagged with a transformation tag, such as a text element 310 tagged with a transformation tag 315. At 230, the transformation script 130 evaluates the content transformation mapping 330 using an element identifier ID(A) 320 of the text element 310 to identify a transformation 335 of a German language string to apply to the text element 310. At 235, the transformation script 130 applies the transformation 335 of the German language string to the text element 310 by replacing text within the text element 310 with the German language string to create a transformed element 350. At 240, the content object 305, with the transformed element 350, is rendered 345 through the display 340.

Figure 4:
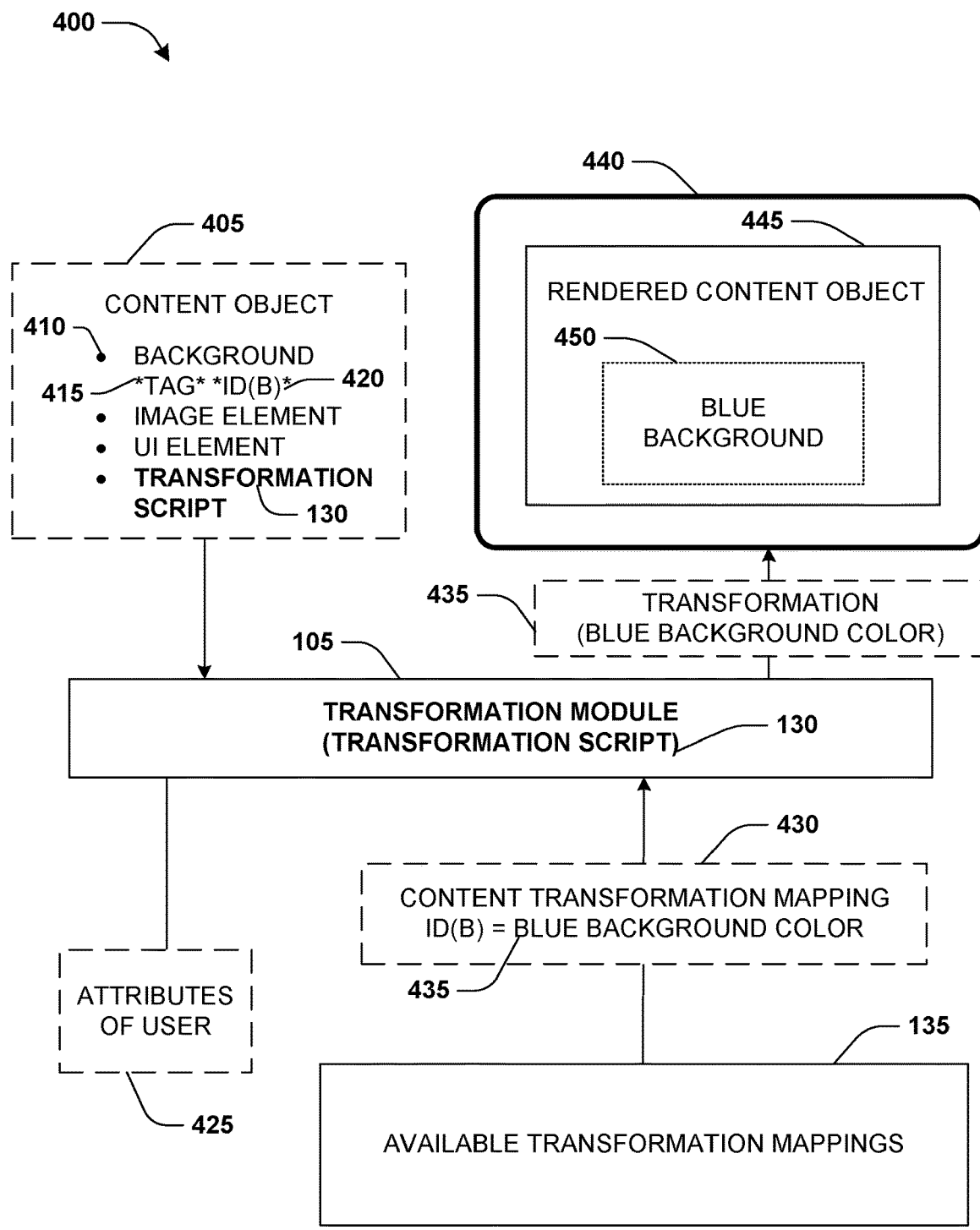
FIG. 4 illustrates an embodiment of a system associated with self-transforming content objects, where a background color attribute is transformed.

With reference to FIG. 4, one embodiment of a system 400 associated with self-transforming content is illustrated. The transformation module 105 is configured to determine that a content object 405 is to be rendered through a display 440. The transformation module 105 evaluates attributes 425 of a user to identify a content preference of the user. In one embodiment, the content preference indicates that the user prefers blue color tones. The transformation module 105 identifies a content transformation mapping 430 from available transformation mappings 135 based upon the content transformation mapping 430 corresponding to blue color tones. The content transformation mapping 430 comprises mappings between element identifiers of elements and blue color attribute transformations to apply to the elements.

The transformation module 105 parses the content object 405 to identify a transformation script 130 embedded within the content object 405. The transformation module 105 executes the transformation script 130 to cause the content object 405 to transform itself. The transformation script 130 parses the content object 405 to identify elements tagged with a transformation tag, such as a background element 410 tagged with a transformation tag 415. The transformation script 130 evaluates the content transformation mapping 430 using an element identifier ID(B) 420 of the background element 410 to identify a transformation 435 of a blue background color to apply to the background element 410. The transformation script 130 applies the transformation 435 of the blue background color to the background element 410 by changing a color attribute to blue to create a transformed element 450. The content object 405, with the transformed element 450, is rendered 445 through the display 440.

Figure 5:
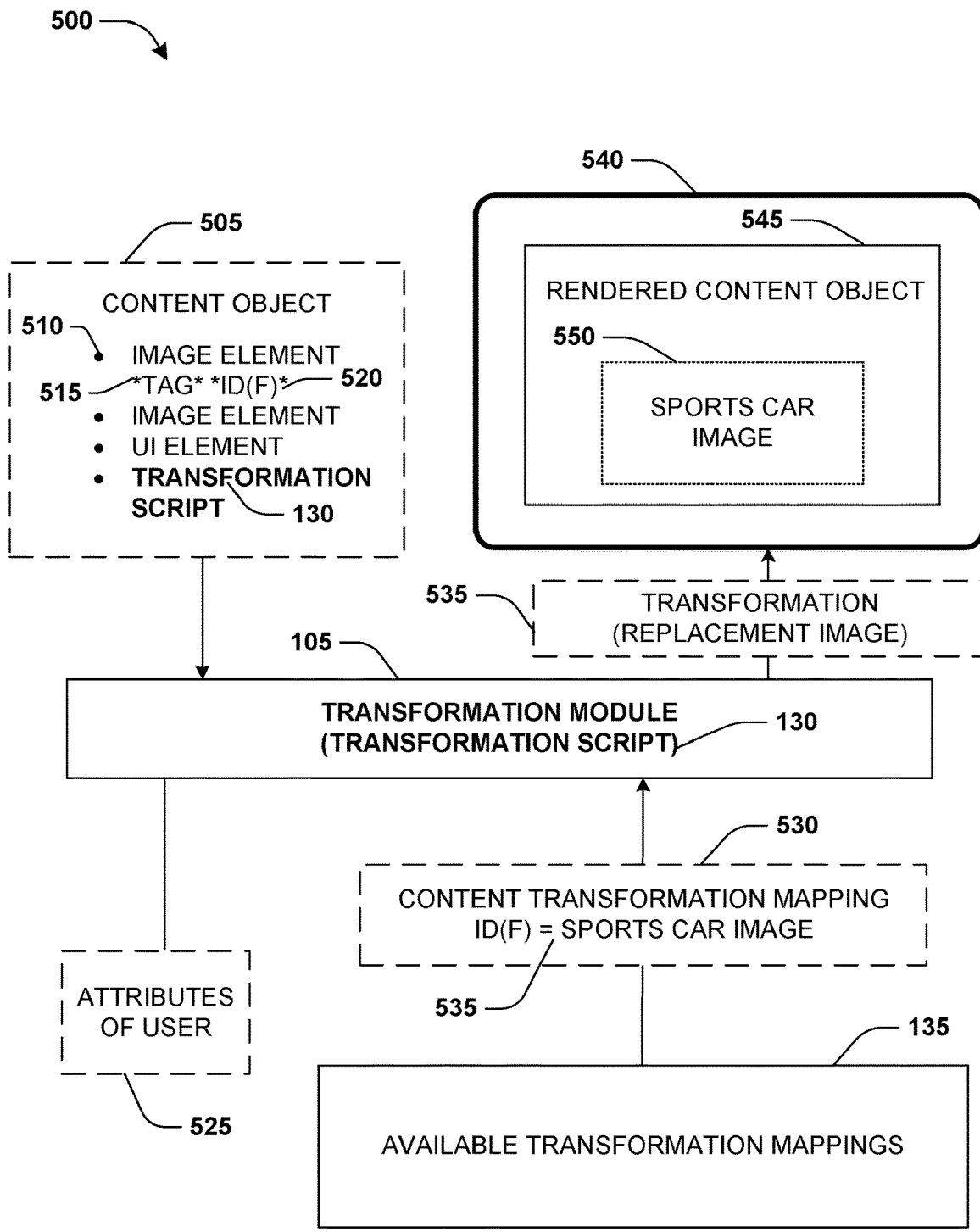
FIG. 5 illustrates an embodiment of a system associated with self-transforming content objects, where a first image is replaced with a second image.

With reference to FIG. 5, one embodiment of a system 500 associated with self-transforming content is illustrated. The transformation module 105 is configured to determine that a content object 505 is to be rendered through a display 540. The transformation module 105 evaluates attributes 525 of a user, such as a social network post about sports cars, to identify a content preference of the user. In one embodiment, the content preference indicates that the user has an interest in sports cars. The transformation module 105 identifies a content transformation mapping 530 from available transformation mappings 135 based upon the content transformation mapping 530 corresponding sport car images, while other content transformation mappings may correspond to other types of images such as truck images. The content transformation mapping 530 comprises mappings between element identifiers of elements and image transformations to apply to the elements.

The transformation module 105 parses the content object 505 to identify a transformation script 130 embedded within the content object 505. The transformation module 105 executes the transformation script 130 to cause the content object 505 to transform itself. The transformation script 130 parses the content object 505 to identify elements tagged with a transformation tag, such as an image element 510 tagged with a transformation tag 515. The transformation script 130 evaluates the content transformation mapping 530 using an element identifier ID(F) 520 of the image element 510 to identify a transformation 535 of a sports car image to apply to the image element 510. The transformation script 130 applies the transformation 535 of the sports car image to the image element 510 to create a transformed element 550 depicting the sports car image. The content object 505, with the transformed element 550, is rendered 545 through the display 540.

Figure 6:
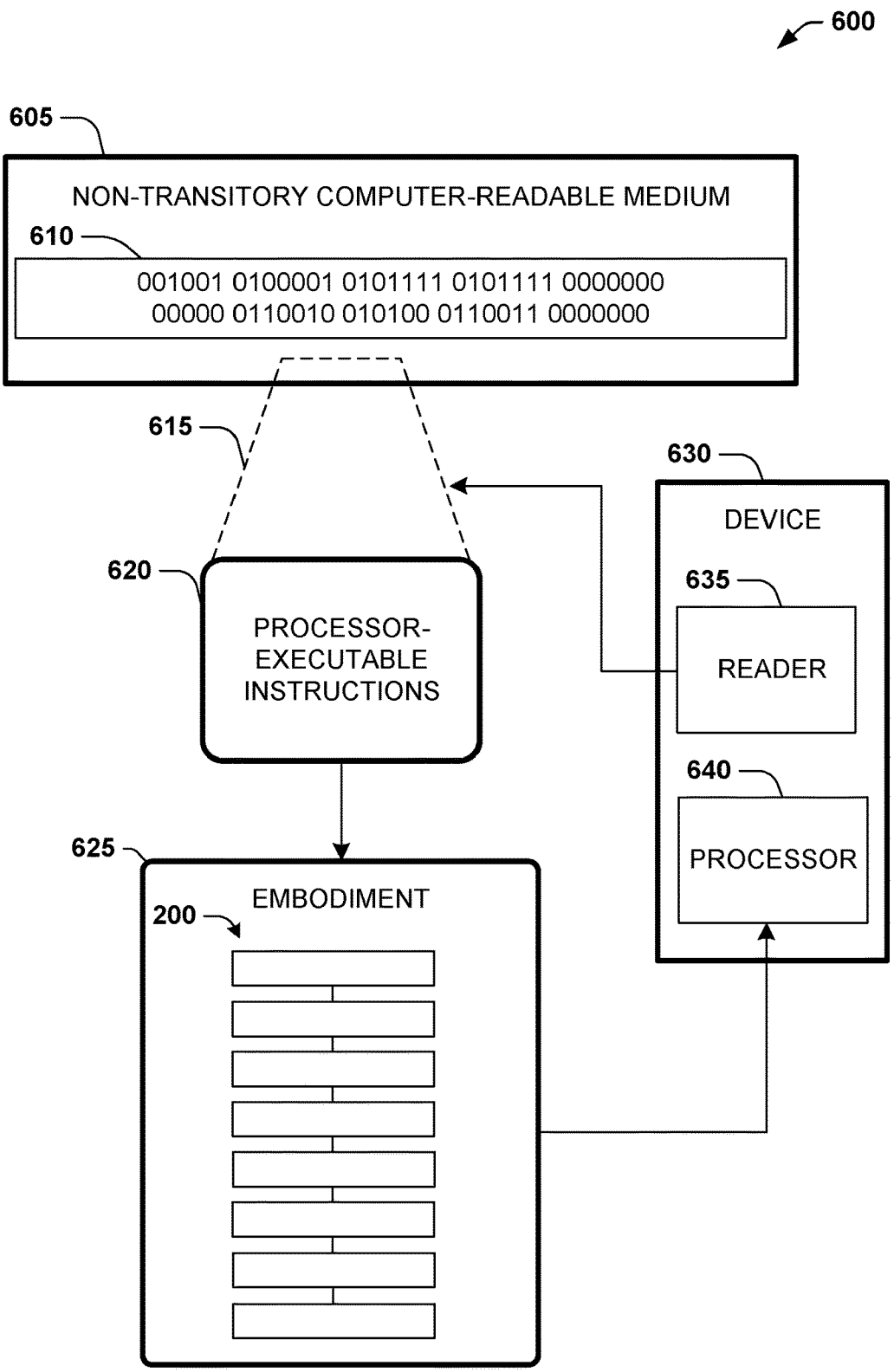
FIG. 6 illustrates an embodiment of a non-transitory computer-readable medium.

FIG. 6 is an illustration of a scenario 600 involving an example non-transitory computer-readable medium 605. In one embodiment, one or more of the components described herein are configured as program modules, such as the transformation module 105, stored in the non-transitory computer-readable medium 605. The program modules are configured with stored instructions, such as processor-executable instructions 620, that when executed by at least a processor, such as processor 640, cause the computing device to perform the corresponding function(s) as described herein. In one embodiment, the, functionality of the transformation module 105, stored in the non-transitory computer-readable medium 605, may be executed by the processor 640 as the processor-executable instructions 620 to perform an embodiment 625 of the method 200 of FIG. 2.

The non-transitory computer-readable medium 605 includes the processor-executable instructions 620 that when executed by a processor 640 cause performance of at least some of the provisions herein. The non-transitory computer-readable medium 605 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 605 stores computer-readable data 610 that, when subjected to reading 615 by a reader 635 of a device 630 (e.g., a read head of a hard disk drive, or a read operation invoked on a solid-state storage device), express the processor-executable instructions 620.

In some embodiments, the processor-executable instructions 620, when executed cause performance of operations, such as at least some of the example method 200 of FIG. 2, for example. In some embodiments, the processor-executable instructions 620 are configured to cause implementation of a system, such as at least some of the example system 100 of FIG. 1, for example.

Figure 7:
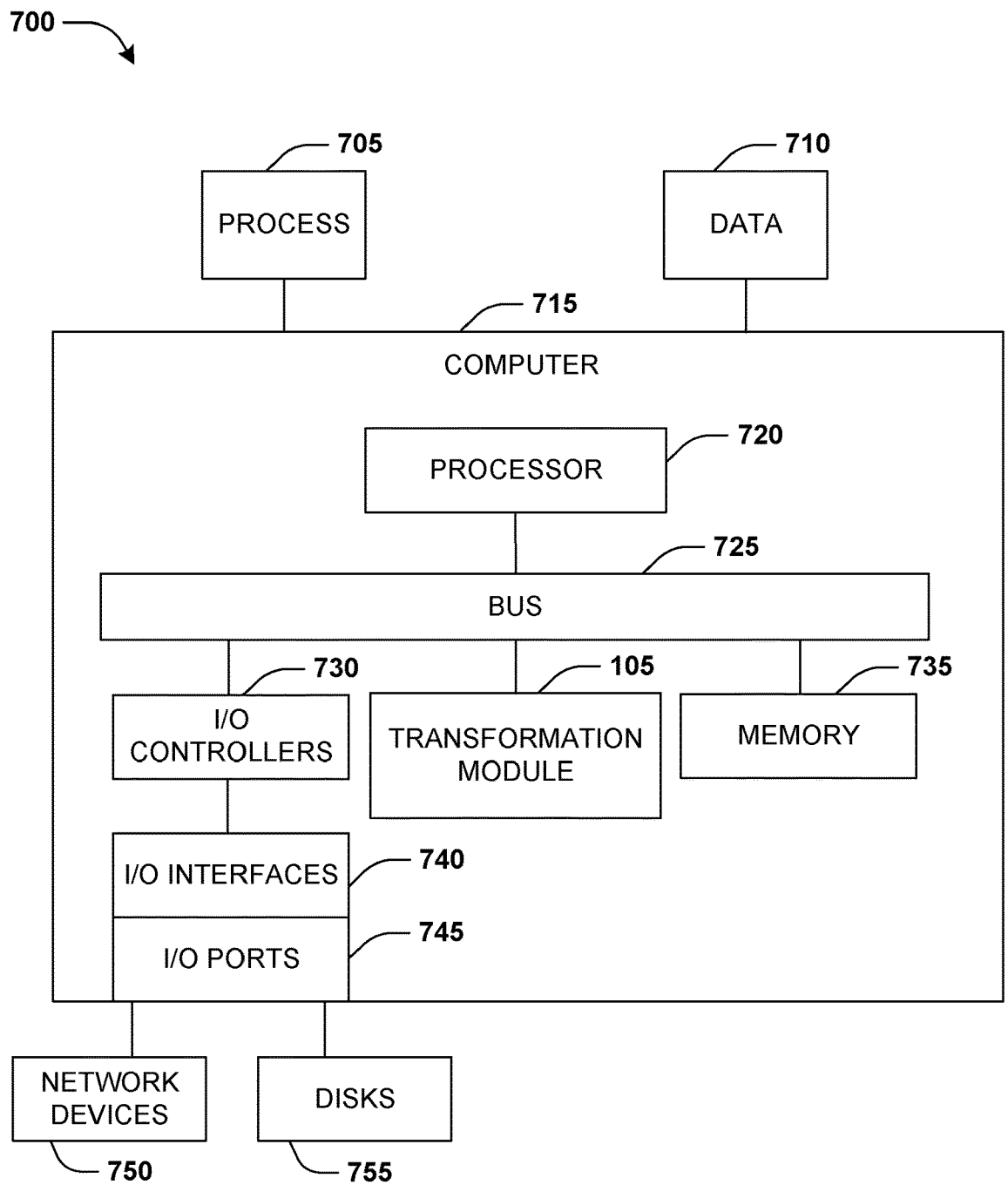
FIG. 7 illustrates an embodiment of a computing system configured with the example systems and/or methods disclosed.

FIG. 7 illustrates an example computing device that is configured and/or programmed with one or more of the example systems and methods described herein, and/or equivalents. The example computing device may be the computer 715 that includes a processor 720, a memory 735, and I/O ports 745 operably connected by a bus 725. In one embodiment, the, the computer 715 may include logic of the transformation module 105 configured to facilitate the system 100 and/or the method 200 shown in FIGS. 1-2. In different embodiments, the logic of the transformation module 105 may be implemented in hardware, a non-transitory computer-readable medium 705 with stored instructions, firmware, and/or combinations thereof. While the logic of the transformation module 105 is illustrated as a hardware component attached to the bus 725, it is to be appreciated that in other embodiments, the logic of the transformation module 105 could be implemented in the processor 720, stored in memory 735, or stored in disk 755.

In one embodiment, logic of the transformation module 105 or the computer 715 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 715 as data 710 that are temporarily stored in memory 735 and then executed by processor 720.

The logic of the transformation module 105 may also provide means (e.g., hardware, non-transitory computer-readable medium 705 that stores executable instructions, firmware) for performing rule based source sequencing for allocation.

Generally describing an example configuration of the computer 715, the processor 720 may be a variety of various processors including dual microprocessor and other multi-processor architectures. The memory 735 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 755 may be operably connected to the computer 715 via, for example, the I/O interface 740 (e.g., card, device) and the I/O ports 745. The disks 755 may be, for example, a magnetic disk drive, a solid state disk drive, a floppy disk drive, a tape drive, a Zip drive, a flash memory card, a memory stick, and so on. Furthermore, the disks 755 may be a CD-ROM drive, a CD-R drive, a CD-RW drive, a DVD ROM, and so on. The memory 735 can store a process, such as within the non-transitory computer-readable medium 705, and/or data 710, for example. The disk 755 and/or the memory 735 can store an operating system that controls and allocates resources of the computer 715.

The computer 715 may interact with input/output (I/O) devices via the I/O interfaces 740 and the I/O ports 745. The I/O devices may be, for example, a keyboard, a microphone, a pointing and selection device, cameras, video cards, displays, the disks 755, the network devices 750, and so on. The I/O ports 745 may include, for example, serial ports, parallel ports, and USB ports. I/O controllers 730 may connect the I/O interfaces 740 to the bus 725.

The computer 715 can operate in a network environment and thus may be connected to the network devices 750 via the I/O interfaces 740, and/or the I/O ports 745. Through the network devices 750, the computer 715 may interact with a network. Through the network, the computer 715 may be logically connected to remote computers (e.g., the computer 715 may reside within a distributed computing environment to which clients may connect). Networks with which the computer 715 may interact include, but are not limited to, a local area network (LAN), a new area network (WAN), and other networks.

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method, the computer-implemented method involving a computing device comprising a processor, and the computer-implemented method comprising:
    determining, by the processor, that a content object is to be rendered;
    evaluating, by the processor, attributes of a user to identify a content preference of the user;
    identifying, by the processor, a content transformation mapping corresponding to the content preference, wherein the content transformation mapping comprises mappings between element identifiers of elements and transformations to apply to the elements;
    parsing, by the processor, the content object to identify a transformation script embedded within the content object;
    executing, by the processor, the transformation script on the content object to cause the content object to transform itself by:
        (i) parsing, by the processor, the content object to identify an element tagged with a transformation tag indicating that the element is to be transformed;
        (ii) evaluating, by the processor, the content transformation mapping using an element identifier of the element to identify a transformation to apply to the element; and
        (iii) applying, by the processor, the transformation to the element to create a transformed element of the content object; and
    rendering, by the processor, the content object with the transformed element.

2. The computer-implemented method of claim 1, further comprising:
    parsing, by the processor, multiple webpages within the content object to identify elements that are tagged with transformation tags.

3. The computer-implemented method of claim 1, further comprising:
    receiving, by the processor, an update for the content object; and
    performing, by the processor, a single update operation to update the content object for a plurality of supported transformations.

4. The computer-implemented method of claim 1, wherein the content object comprises a website, and the parsing the content object to identify the element further comprising:
    parsing, by the processor, the website during a page load event to identify transformation tags; and
    applying, by the processor, transformations to elements tagged with the transformation tags.

5. The computer-implemented method of claim 1, wherein the attributes of the user comprise at least one of a location of the user, a language preference specified by the user, a user profile, social network data, or demographic data of the user.

6. The computer-implemented method of claim 1, wherein the transformation comprises a language translation of text of the element.

7. A non-transitory computer-readable medium storing computer-executable instructions that when executed by a processor of a computer causes the processor to:
    determine that a content object is to be rendered through a display;
    evaluate attributes of a user to identify a content preference of the user;
    identify a content transformation mapping corresponding to the content preference, wherein the content transformation mapping comprises mappings between element identifiers of elements and transformations to apply to the elements;
    parse the content object to identify a transformation script embedded within the content object;
    execute the transformation script on the content object to cause the content object to transform itself by:
        (i) parsing the content object to identify an element tagged with a transformation tag indicating that the element is to be transformed;
        (ii) evaluating the content transformation mapping using an element identifier of the element to identify a transformation to apply to the element; and
        (iii) applying the transformation to the element to create a transformed element of the content object; and
    render the content object with the transformed element through the display.

8. The non-transitory computer-readable medium of claim 7, wherein the computer-executable instructions for parsing the content object to identify the element comprise computer-executable instructions to cause the processor to:
  execute the transformation script to parse a document object model of the content object during a rendering phase to identify markup language within the document object model matching a transformation tag template.

9. The non-transitory computer-readable medium of claim 7, wherein the computer-executable instructions for applying the transformation comprise computer-executable instructions to cause the processor to:
  execute the transformation script to apply the transformation to the element during a rendering phase, wherein the transformation script replaces a first value of an attribute of the element with a second value specified by the transformation.

10. The non-transitory computer-readable medium of claim 7, wherein the computer-executable instructions for applying the transformation comprise computer-executable instructions to cause the processor to:
  execute the transformation script to replace a text string of the element in a first language to a second text string in a second language specified by the transformation.

11. The non-transitory computer-readable medium of claim 7, wherein the computer-executable instructions for identifying the content transformation mapping comprise computer-executable instructions to cause the processor to:
  perform an asynchronous call to a server to retrieve a property file comprising the content transformation mapping.

12. The non-transitory computer-readable medium of claim 7, wherein the computer-executable instructions for applying the transformation comprise computer-executable instructions to cause the processor to:
  execute the transformation script to change an attribute of the element from a first value to a second value specified by the transformation.

13. The non-transitory computer-readable medium of claim 7, wherein the computer-executable instructions for applying the transformation comprise computer-executable instructions to cause the processor to:
  execute the transformation script to change a visibility attribute of the element from a first value to a second value specified by the transformation.

14. The non-transitory computer-readable medium of claim 7, wherein the computer-executable instructions for applying the transformation comprise computer-executable instructions to cause the processor to:
  execute the transformation script to change the element from displaying a first image to displaying a second image specified by the transformation.

15. A computing system, comprising:
  a processor connected to memory; and
  a transformation module stored on a non-transitory computer readable medium and configured with instructions that when executed by the processor cause the processor to:
    determine that a content object is to be rendered;
    evaluate attributes of a user to identify a content preference of the user;
    identify a content transformation mapping corresponding to the content preference, wherein the content transformation mapping comprises mappings between element identifiers of elements and transformations to apply to the elements;
    parse the content object to identify a transformation script embedded within the content object;
    execute the transformation script on the content object to cause the content object to transform itself by:
      (i) parsing the content object to identify an element tagged with a transformation tag indicating that the element is to be transformed;
      (ii) evaluating the content transformation mapping using an element identifier of the element to identify a transformation to apply to the element; and
      (iii) applying the transformation to the element to create a transformed element of the content object; and
    render the content object with the transformed element.

16. The computing system of claim 15, wherein the content object comprises a website, and the instructions for parsing the content object to identify the element comprise instructions to cause the processor to:
  execute the transformation script to:
    parse the website during a page load event to identify transformation tags; and
    apply transformations to elements tagged with the transformation tags.

17. The computing system of claim 15, wherein the element is tagged with declarative syntax defining the transformation tag.

18. The computing system of claim 15, wherein the instructions for parsing the content object to identify the element comprise instructions to cause the processor to:
  execute the transformation script to parse a document object model associated with the content object to identify transformation tags used to tag elements within the content object.

19. The computing system of claim 15, wherein the instructions for applying the transformation comprise instructions to cause the processor to:
  execute the transformation script to change a color property setting for the element from a first color value to a second color value specified by the transformation.

20. The computing system of claim 15, wherein the instructions cause the processor to:
  determine that the content object is to be displayed to a second user;
  evaluate second attributes of the second user to identify a second content preference of the second user;
  identify a second content transformation mapping corresponding to the second content preference;
  evaluate the second content transformation mapping to identify a second transformation, different than the transformation, to apply to the element; and
  apply the second transformation to the element to create a second transformed element of the content object.

* * * * *